US012771725B2

(12) United States Patent
Rajput et al.

(10) Patent No.: US 12,771,725 B2
(45) Date of Patent: Oct. 20, 2026

(54) METHODS, SYSTEMS, AND COMPUTER READABLE MEDIA FOR OUT-OF-BAND TRANSPORT LAYER SECURITY (TLS) VERSION AND PARAMETER NEGOTIATION USING A NETWORK FUNCTION REPOSITORY FUNCTION (NRF)

(71) Applicant: Oracle International Corporation, Redwood Shores, CA (US)

(72) Inventors: Jay Rajput, Bangalore (IN); Virendra Singh, Bangalore (IN); John Nirmal Mohan Raj, Bangalore (IN); Ashish Jyoti Sharma, New Delhi (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 387 days.

(21) Appl. No.: 18/409,488

(22) Filed: Jan. 10, 2024

(65) Prior Publication Data

US 2025/0227126 A1 Jul. 10, 2025

(51) Int. Cl.
*H04L 9/40* (2022.01)

(52) U.S. Cl.
CPC ............ *H04L 63/166* (2013.01); *H04L 63/20* (2013.01)

(58) Field of Classification Search
CPC .............................. H04L 63/166; H04L 63/20
See application file for complete search history.

(56) References Cited

U.S. PATENT DOCUMENTS

2024/0163271 A1* 5/2024 Krishan ................ H04L 9/3213

OTHER PUBLICATIONS

3rd Generation Partnership Project; Technical Specification Group Core Network and Terminals; 5G System; Network Function Repository Services; Stage 3 (Release 18) 3GPP TS 29.510 V18.4.0 (Sep. 2023).
3rd Generation Partnership Project; Technical Specification Group Services and System Aspects; System architecture for the 5G System; Stage 2 (Release 18) 3GPP TS 23.501 V18.3.0 (Sep. 2023).
Rescorla, E., "The Transport Layer Security (TLS) Protocol Version 1.3," IETF RFC 8446 (Aug. 2018).

* cited by examiner

*Primary Examiner* — Nader Bolourchi
(74) *Attorney, Agent, or Firm* — Jenkins, Taylor & Hunt, P.A.

(57) ABSTRACT

An example method includes registering, at a network function repository function (NRF) of a telecommunications network, a producer network function, including receiving a first transport layer security (TLS) version for the producer network function; providing, by the NRF, the first TLS version of the producer network function to a consumer network function in a network function discovery response; and establishing, by the consumer network function, a service based interface (SBI) communication with the producer network function based on the first TLS version and a second TLS version for the consumer network function.

20 Claims, 7 Drawing Sheets

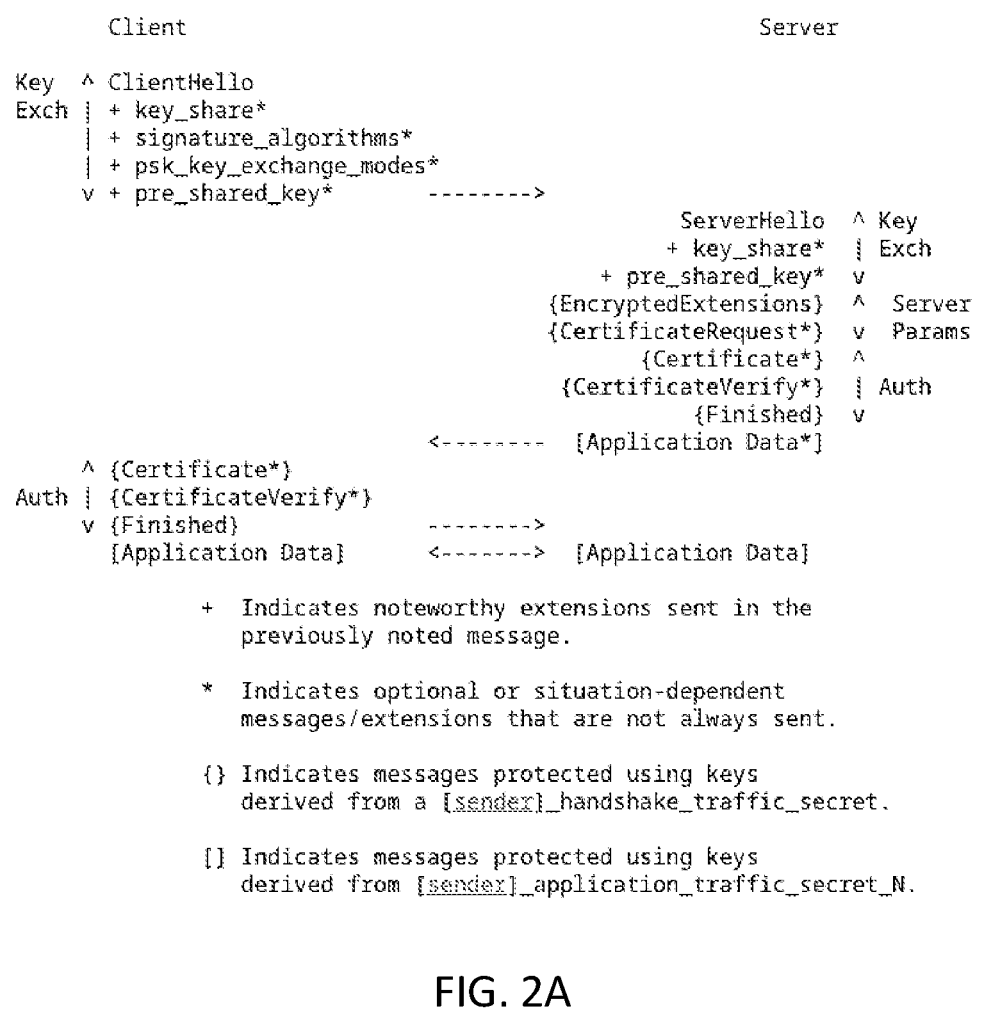

```
       Client                                               Server

Key  ^ ClientHello
Exch | + key_share*
     | + signature_algorithms*
     | + psk_key_exchange_modes*
     v + pre_shared_key*       -------->
                                                  ServerHello  ^ Key
                                                 + key_share*  | Exch
                                            + pre_shared_key*  v
                                        {EncryptedExtensions}  ^  Server
                                        {CertificateRequest*}  v  Params
                                               {Certificate*}  ^
                                         {CertificateVerify*}  | Auth
                                                   {Finished}  v
                           <--------  [Application Data*]
     ^ {Certificate*}
Auth | {CertificateVerify*}
     v {Finished}              -------->
       [Application Data]      <------->  [Application Data]

              +  Indicates noteworthy extensions sent in the
                 previously noted message.

              *  Indicates optional or situation-dependent
                 messages/extensions that are not always sent.

              {} Indicates messages protected using keys
                 derived from a [sender]_handshake_traffic_secret.

              [] Indicates messages protected using keys
                 derived from [sender]_application_traffic_secret_N.
```

FIG. 2A

```
   Client                                               Server

   ClientHello                  -------->
                                                   ServerHello
                                                  Certificate*
                                            ServerKeyExchange*
                                           CertificateRequest*
                                <--------      ServerHelloDone
   Certificate*
   ClientKeyExchange
   CertificateVerify*
   [ChangeCipherSpec]
   Finished                     -------->
                                            [ChangeCipherSpec]
                                <--------             Finished
   Application Data             <------->     Application Data

          Figure 1.  Message flow for a full handshake

* Indicates optional or situation-dependent messages that are not
always sent.
```

FIG. 2B

```
enum {
    server_name(0),                             /* RFC 6066 */
    max_fragment_length(1),                     /* RFC 6066 */
    status_request(5),                          /* RFC 6066 */
    supported_groups(10),                       /* RFC 8422, 7919 */
    signature_algorithms(13),                   /* RFC 8446 */
    use_srtp(14),                               /* RFC 5764 */
    heartbeat(15),                              /* RFC 6520 */
    application_layer_protocol_negotiation(16), /* RFC 7301 */
    signed_certificate_timestamp(18),           /* RFC 6962 */
    client_certificate_type(19),                /* RFC 7250 */
    server_certificate_type(20),                /* RFC 7250 */
    padding(21),                                /* RFC 7685 */
    pre_shared_key(41),                         /* RFC 8446 */
    early_data(42),                             /* RFC 8446 */
    supported_versions(43),                     /* RFC 8446 */
    cookie(44),                                 /* RFC 8446 */
    psk_key_exchange_modes(45),                 /* RFC 8446 */
    certificate_authorities(47),                /* RFC 8446 */
    oid_filters(48),                            /* RFC 8446 */
    post_handshake_auth(49),                    /* RFC 8446 */
    signature_algorithms_cert(50),              /* RFC 8446 */
    key_share(51),                              /* RFC 8446 */
    (65535)
} ExtensionType;
```

FIG. 2C

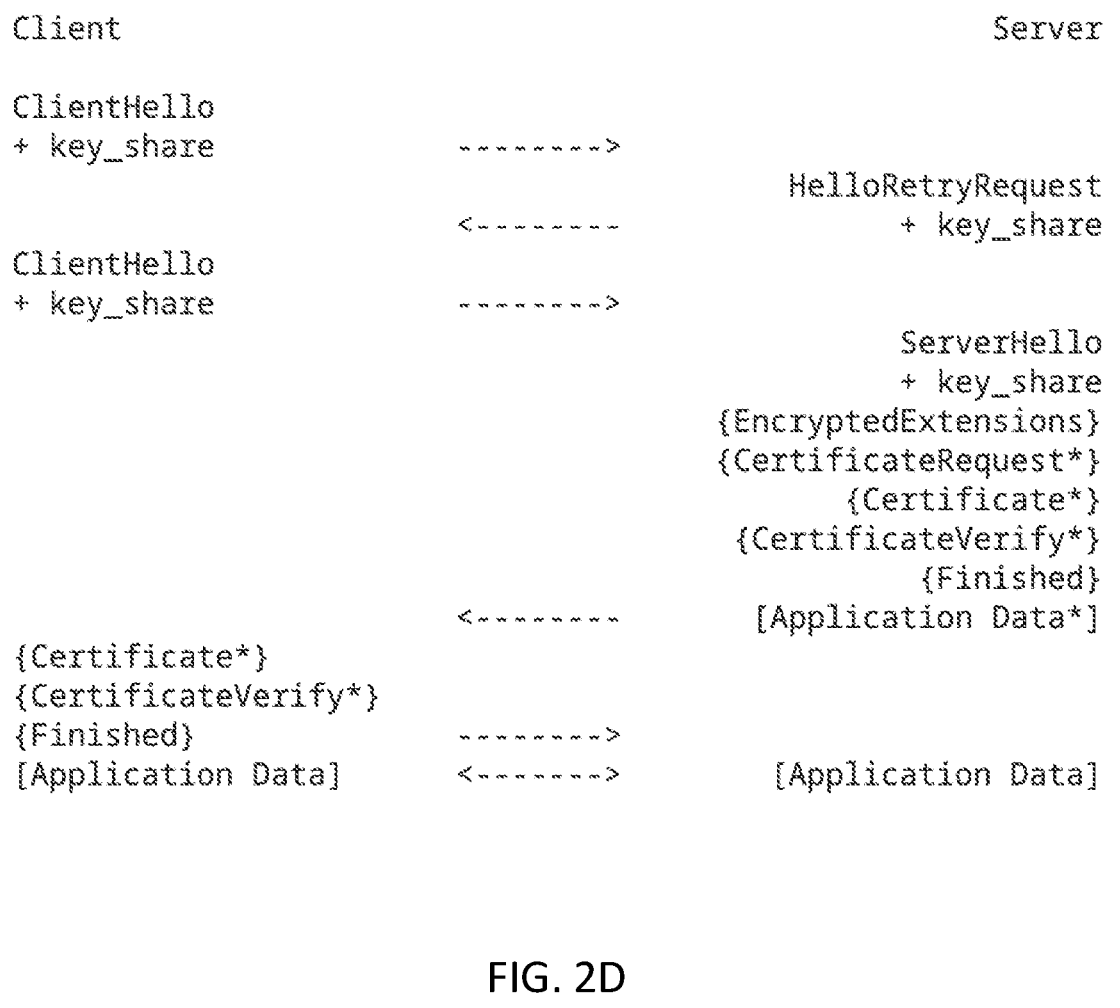

```
Client                                                  Server

ClientHello
+ key_share               -------->
                                             HelloRetryRequest
                          <--------                + key_share
ClientHello
+ key_share               -------->
                                                   ServerHello
                                                   + key_share
                                         {EncryptedExtensions}
                                         {CertificateRequest*}
                                                {Certificate*}
                                          {CertificateVerify*}
                                                    {Finished}
                          <--------        [Application Data*]
{Certificate*}
{CertificateVerify*}
{Finished}                -------->
[Application Data]        <------->         [Application Data]
```

FIG. 2D

METHODS, SYSTEMS, AND COMPUTER READABLE MEDIA FOR OUT-OF-BAND TRANSPORT LAYER SECURITY (TLS) VERSION AND PARAMETER NEGOTIATION USING A NETWORK FUNCTION REPOSITORY FUNCTION (NRF)

TECHNICAL FIELD

The subject matter described herein relates to establishing communications channels for network functions (NFs) More particularly, the subject matter described herein relates to methods, systems, and computer readable media for out-of-band TLS version and parameter negotiation.

BACKGROUND

While promising significant security enhancements, deploying TLS 1.3 in 5G core networks introduces the challenge of backward compatibility with existing TLS 1.2 infrastructure. Unlike smoother transitions between earlier versions, TLS 1.3's incompatibility necessitates explicit version negotiation at the handshaking stage. This relies on the ClientHello message carrying a "supported_versions" extension to advertise its capabilities. Ideally, a TLS 1.2 server should recognize this extension and, if unable to support TLS 1.3, use the ClientHello's "legacy_version" field to gracefully fallback to a compatible version, such as TLS 1.2.

However, the potential for improperly written TLS 1.2 servers complicates this process. These servers may abruptly abort the handshake upon encountering unfamiliar extensions like "supported_versions," causing connection failures. Consequently, mitigating this vulnerability requires careful server and client configuration, considering legacy compatibility alongside the security benefits of TLS 1.3.

In light of these and other difficulties, there exists a need for improved methods, systems, and computer readable media for out-of-band TLS version and parameter negotiation.

SUMMARY

An example method includes registering, at a network function repository function (NRF) of a telecommunications network, a producer network function, including receiving a first transport layer security (TLS) version for the producer network function; providing, by the NRF, the first TLS version of the producer network function to a consumer network function in a network function discovery response; and establishing, by the consumer network function, a service based interface (SBI) communication with the producer network function based on the first TLS version and a second TLS version for the consumer network function.

According to another aspect of the subject matter described herein, the method includes registering, at the NRF, the consumer network function and receiving the second TLS version for the consumer network function during registration.

According to another aspect of the subject matter described herein, registering the producer network function and the consumer network function comprises storing the first TLS version in a first network function profile for the producer network function and storing the second TLS version in a second network function profile for the consumer network function.

According to another aspect of the subject matter described herein, registering the producer network function and the consumer network function comprises storing one or more first TLS parameters in a first network function profile for the producer network function and storing one or more second TLS parameters in a second network function profile for the consumer network function.

According to another aspect of the subject matter described herein, the method includes finding, at the NRF, one or more misconfigured TLS parameters in a plurality of network function profiles stored by the NRF.

According to another aspect of the subject matter described herein, the method includes notifying a network operator of the one or more misconfigured TLS parameters.

According to another aspect of the subject matter described herein, the method includes applying one or more operator-based policies using a plurality of TLS parameters stored in a plurality of network function profiles.

An example system includes at least one processor and a memory. The system includes an NF repository function (NRF) of a telecommunications network, the NRF being implemented using the at least one processor and configured for: registering a producer network function, including receiving a first transport layer security (TLS) version for the producer network function; and providing, by the NRF, the first TLS version of the producer network function to a consumer network function in a network function discovery response. The consumer network function is configured for establishing a service based interface (SBI) communication with the producer network function based on the first TLS version and a second TLS version for the consumer network function.

According to another aspect of the subject matter described herein, the NRF is configured for registering, at the NRF, the consumer network function and receiving the second TLS version for the consumer network function during registration.

According to another aspect of the subject matter described herein, registering the producer network function and the consumer network function comprises storing the first TLS version in a first network function profile for the producer network function and storing the second TLS version in a second network function profile for the consumer network function.

According to another aspect of the subject matter described herein, registering the producer network function and the consumer network function comprises storing one or more first TLS parameters in a first network function profile for the producer network function and storing one or more second TLS parameters in a second network function profile for the consumer network function.

According to another aspect of the subject matter described herein, the NRF is configured for finding, at the NRF, one or more misconfigured TLS parameters in a plurality of network function profiles stored by the NRF.

According to another aspect of the subject matter described herein, the NRF is configured for notifying a network operator of the one or more misconfigured TLS parameters.

According to another aspect of the subject matter described herein, the NRF is configured for applying one or more operator-based policies using a plurality of TLS parameters stored in a plurality of network function profiles.

According to another aspect of the subject matter described herein, a non-transitory computer readable medium having stored thereon executable instructions that when executed by a processor of a computer control the computer to perform steps is provided. The steps include registering, at a network function repository function (NRF) of a telecommunications network, a producer network function, including receiving a first transport layer security (TLS) version for the producer network function; providing, by the NRF, the first TLS version of the producer network function to a consumer network function in a network function discovery response; and establishing, by the consumer network function, a service based interface (SBI) communication with the producer network function based on the first TLS version and a second TLS version for the consumer network function.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which:

FIGS. 2A-2D illustrate aspects of the TLS 1.3 handshake;

DETAILED DESCRIPTION

This document describes methods, systems, and computer readable media for solving TLS inter-operability issues and improving performance and security by out-of-band negotiation of TLS version and parameters. Network functions can provide TLS version and parameters as part of the NF discovery process.

RFC 8446 highlights the challenge of incorporating TLS 1.3 into 5G core networks due to its incompatibility with previous TLS versions. This mandates a version negotiation mechanism to establish seamless communication. However, the introduction of new extensions in TLS 1.3's ClientHello message, such as supported_versions, key_share, and signature_algorithms_cert, poses potential interoperability issues with legacy TLS 1.2 servers.

The crux of the challenge lies in the NF Consumer's initial unawareness of the NF Producer's supported TLS version. This leads to the transmission of ClientHello with TLS 1.3 extensions, even towards TLS 1.2 servers. While ideally, a TLS 1.2 server should gracefully handle unsupported extensions, real-world implementations often exhibit unpredictable behaviors, including handshake terminations.

Beyond interoperability concerns, frequent TLS parameter negotiation for each new TCP/TLS connection introduces performance overheads and potential vulnerabilities associated with insecure parameter selection.

To address these concerns, this document proposes the inclusion of TLS version and parameter information within NF discovery responses. This enables clients to proactively select compatible versions and parameters, fostering interoperability, enhanced performance, and a more robust security posture.

Furthermore, storing this information within NF profiles at the NRF offers several advantages:

- Improved visibility: Gain a comprehensive overview of TLS usage across the network, aiding security audits and posture assessments.
- Misconfiguration detection: Enable the NRF to proactively identify and alert customers or operators regarding misconfigured TLS parameters.
- Policy enforcement: Facilitate the application of customer or operator-defined policies to ensure NFs adhere to organizational TLS requirements during registration.

By adopting these measures, 5G networks can effectively address TLS interoperability challenges, enhance performance, and bolster security posture through comprehensive visibility and control.

Figure 1:
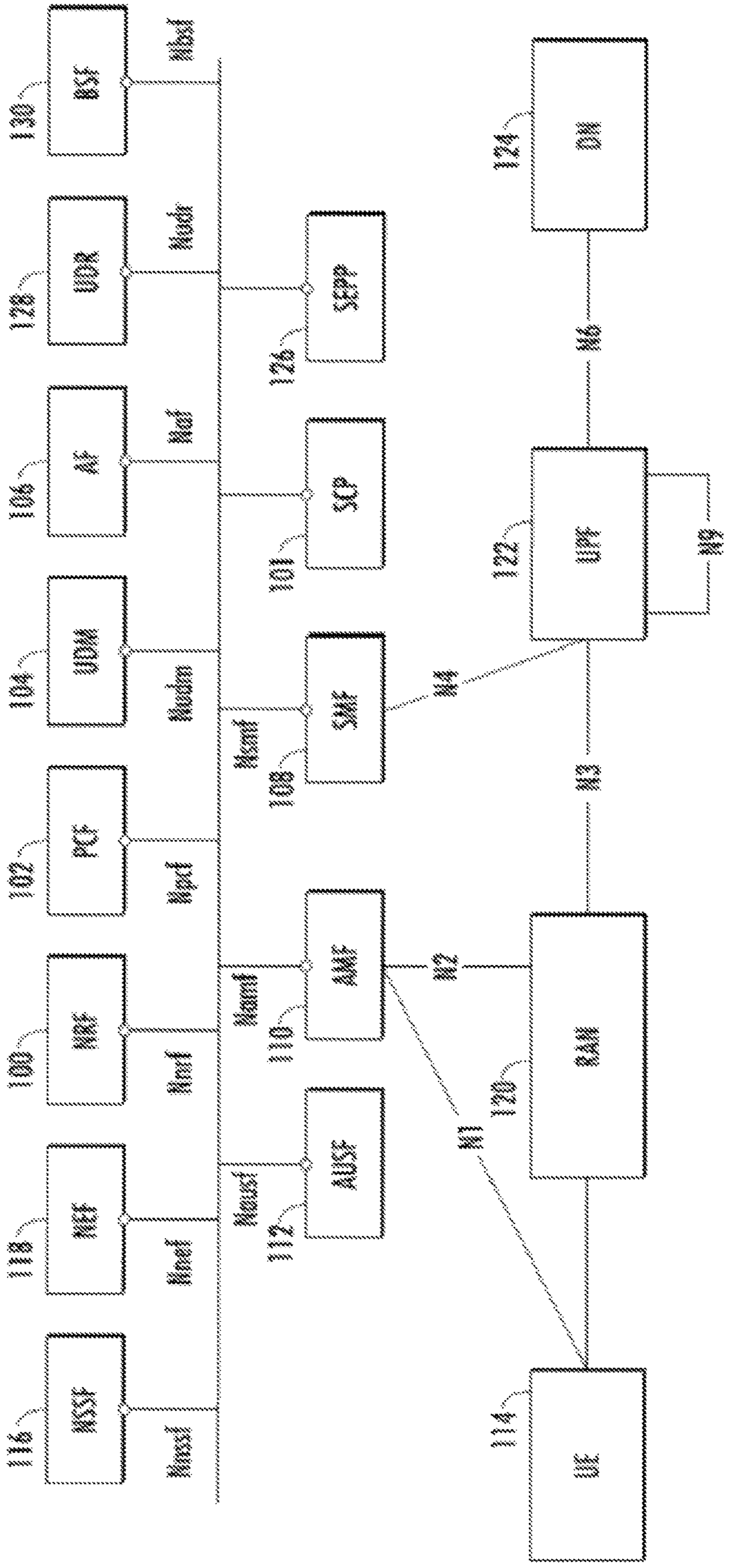
FIG. 1 is a block diagram illustrating an example 5G system network architecture.

FIG. 1 is a block diagram illustrating an example 5G system network architecture. In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. An NF instance is an instance of a producer NF that provides a service. A given producer NF may include more than one NF instance.

NFs register with a network function repository function (NRF). The NRF maintains profiles of available NF instances identifying the services supported by each NF instance. The profile of an NF instance is referred to in 3GPP TS 29.510 as an NF profile.

NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the type of service provided by an NF instance as well as contact and capacity information regarding the NF instance.

The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. To communicate with a producer NF instance, a consumer NF or an SCP must obtain the NF profile of the producer NF instance from NRF 100. The NF profile is a Javascript object notation (JSON) data structure defined in 3GPP TS 29.510. The NF profile includes attributes that indicate the type of service provided, capacity of the NF instance, and information for contacting the NF instance.

In FIG. 1, any of the network functions can be consumer NFS, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between an access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. NSSF 116 provides the NSSelection service, which allows NFs to request information about network slices and the NSSAIReachability service, which enables NFs to update and subscribe to receive notification of updates in network slice selection assistance information (NSSAI) reachability information.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a gNB (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN. A unified data repository (UDR) 128 stores subscription data for UEs. A binding support function (BSF) 130 manages bindings between PDU sessions and PCFs.

FIGS. 2A-2D illustrate aspects of the TLS 1.3 handshake. TLS plays a critical role in securing communications within the 5G core network, ensuring the confidentiality and integrity of data exchanged between network functions. As an essential cryptographic protocol, TLS establishes a secure channel for data transmission, safeguarding against eavesdropping and tampering by malicious entities. Within the 5G ecosystem, TLS is paramount in protecting sensitive information as it traverses the network, including user data, signaling messages, and control plane communications.

Network functions within the 5G core leverage TLS to encrypt and authenticate connections, preventing unauthorized access and bolstering the overall resilience of the communication infrastructure. The implementation of TLS in the 5G core is not only integral to preserving the privacy of user information but also contributes to the reliability and trustworthiness of the network, meeting the stringent security requirements essential for the deployment of advanced and diverse services in the 5G era.

RFC 5246 section 7.3 defines the TLS handshake protocol. The handshake is introduced before TLS extensions and version negotiation.

FIG. 2A shows the message flow for the basic full TLS handshake. The TLS 1.3 handshake streamlines secure communication two basic components. The client initiates the handshake by sending a “ClientHello” containing its supported versions and capabilities, including new extensions like “supported_versions”. Ideally, the server gracefully detects this and negotiates, but some legacy servers may falter. If compatible, the server responds with its chosen version and completes the handshake with encryption parameters and authentication. This swift dance establishes a secure tunnel for the actual data exchange, all in a single round-trip, making TLS 1.3 faster and more secure than its predecessors.

FIG. 2B shows the message flow for a full handshake in TLS 1.2. In a TLS 1.2 handshake, first, the client sends a greeting, showcasing its preferred ciphers and certificates. The server checks its configuration, choosing compatible options and sending its own preferences. Both sides verify identities through digital certificates, exchanging signed signatures. Finally, they share a secret key, allowing encrypted communication to begin. This multi-round procedure, though slower than its TLS 1.3 descendant, lays the foundation for secure online interactions we take for granted.

FIG. 2C shows new extensions in TLS 1.3. RFC 8446 section 4.2 listed all the extensions supported by TLS. The new extensions are explained by RFC 8446. TLS 1.3 can include the following extensions: supported_versions streamlines version negotiation, key_share speeds up encryption, signature_algorithms_cert expands authentication options, pre-shared_key offers efficient reconnections, and early_data slashes communication delays. These extensions, along with other TLS 1.3 advancements, elevate security and performance for faster, safer communications. Nonetheless, extensions started from 41 to 51 value are new and may create an interoperability issue.

FIG. 2D is a message flow diagram for a full handshake with mismatched parameters due to an incorrect key exchange. RFC 8446 section 2.1 indicates that incorrect or incomplete information in the ClientHello will cause HelloRetryRequest which means another round trip impacting performance. To configure the system, incorrect/incomplete information shall be avoided in the first ClientHello to avoid an extra round trip which impacts performance.

Figure 3:
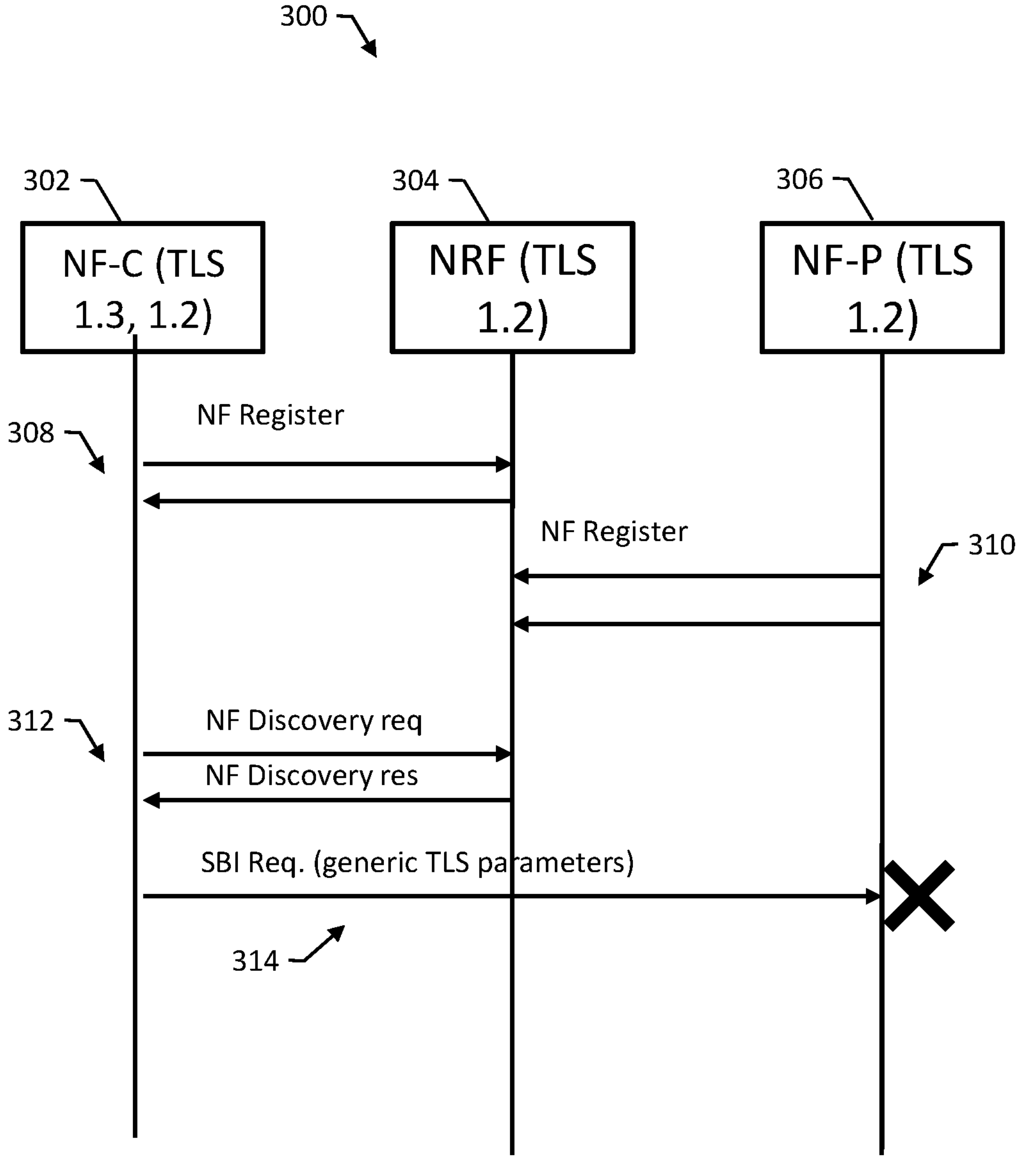
FIG. 3 is a message flow diagram illustrating example messages exchanged between a consumer network function, an NRF, and a producer network function in the NF discovery service operation.

FIG. 3 is a message flow diagram illustrating example messages 300 exchanged between a consumer network function 302, an NRF 304, and a producer network function 306 in the NF discovery service operation.

FIG. 3 illustrates how interoperability issues between TLS versions of a consumer network function and a producer network function can impact the SBI communications between them.

- TLS 1.3 is not compatible with TLS 1.2 and relies on version negotiation.
- Version negotiation mechanism relies on sending supported_versions extension in Client Hello which may cause a TLS 1.2 implementation wrongly aborting TLS connection.
- New extensions introduced by TLS 1.3 may not be supported by NF-P running TLS 1.2

Further, TLS parameter negotiation typically must be repeated for each new TLS connection, which can impact performance. Incomplete information in the ClientHello causes another round trip, which should be avoided to improve performance. Further, TLS parameter negotiation potentially exposes security attacks that may be exploited.

Referring to FIG. 3, the consumer network function 302 exchanges messages 308 with the NRF 304 to register with the NRF 304. The producer network function 306 exchanges messages 310 with the NRF 304 to register with the NRF 304. The consumer network function 302 then exchanges messages 312 with the NRF 304 for a network discovery request that results in identification of the producer network function 306. Then the consumer network function 302 sends an SBI request message 314 using generic TLS parameters, but the request fails due to the consumer network function using TLS 1.3 and the producer network function only being configured for TLS 1.2.

Figure 4:
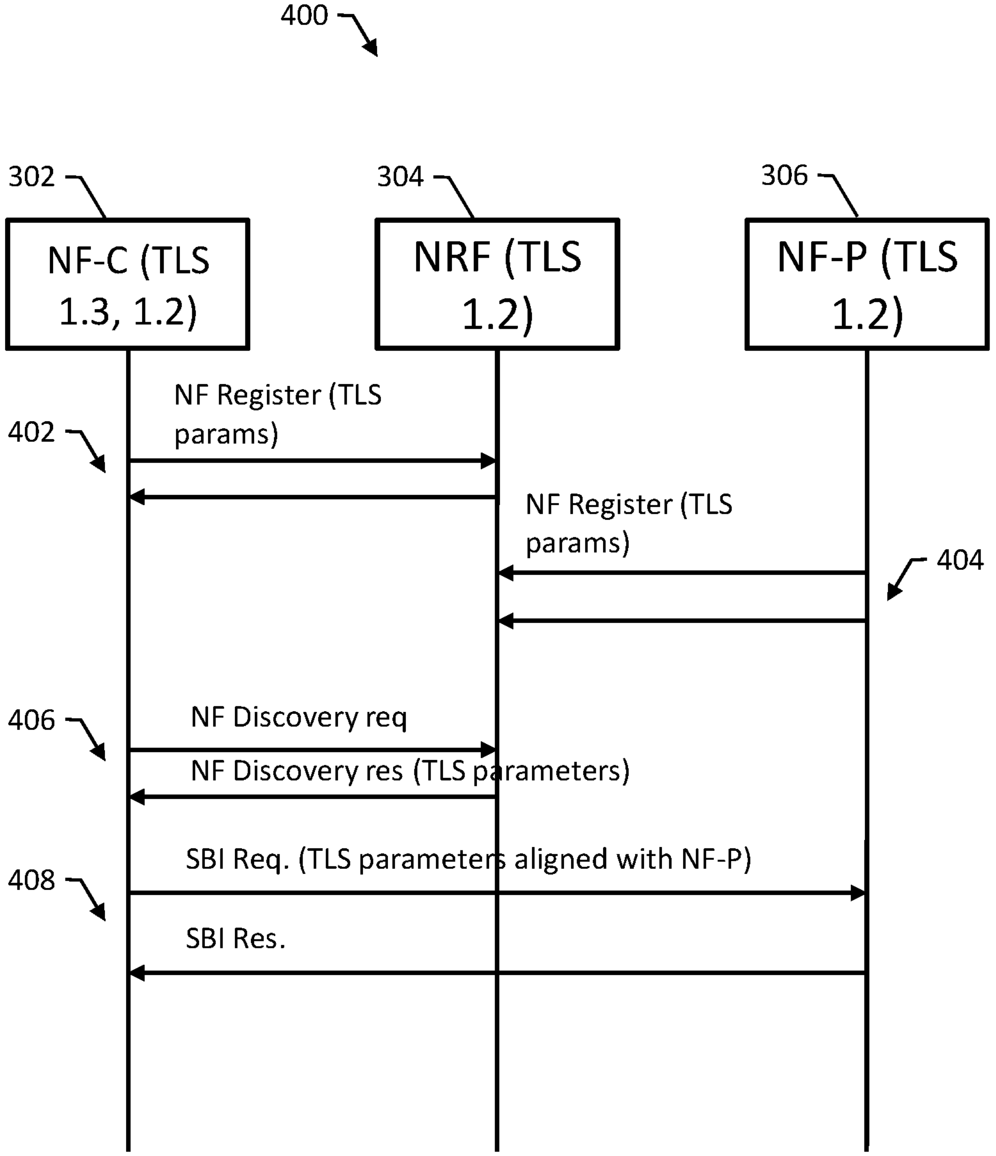
FIG. 4 is a message flow diagram illustrating example messages exchanged between a consumer network function, an NRF, and a producer network function in the NF discovery service operation.

FIG. 4 is a message flow diagram illustrating example messages 400 exchanged between a consumer network function 302, an NRF 304, and a producer network function 306 in the NF discovery service operation.

Both the consumer network function 302 and the producer network function 306 provide TLS version information and optionally other parameters as part of registering with the NRF 304. The NRF 304 provides the TLS version and parameters of the producer network function 306 to the consumer network function 302 in a discovery response. As a result, the consumer network function 302 is able to correctly establish the SBI communication with the producer network function 306.

The NRF 304 can store the TLS version and parameter information in network function profiles. The NF profiles typically encompass crucial information about each network function's capabilities and characteristics. These profiles serve as a comprehensive reference for the dynamic orchestration and management of network services. The NRF 304, in some cases, maintains a structured database containing details such as supported interfaces, service capabilities, and specific attributes relevant to each NF. This information is regularly updated by network functions as they register with the NRF 304, ensuring real-time accuracy and reflecting the evolving nature of the network. The storage of NF profiles by the NRF 304 enables efficient service discovery, dynamic adaptation, and interoperability within the 5G core.

This solution can provide one or more of the following advantages:

- Solves interoperability issues between NF consumer and NF producer by performing TLS version and parameter negotiation upfront using NF discovery response.
- Improves performance by reducing the round trips involved in TLS handshake by avoiding TLS parameter mismatch.
- Mitigates security attacks by using pre-defined TLS parameters that can be audited at the NRF against user-defined policies.
- Value added feature for various NFs.
- Easy to implement.

Referring to FIG. 4, the consumer network function 302 exchanges messages 402 with the NRF 304 to register with the NRF 304. The messages 402 include TLS version and parameter information. The producer network function 306 exchanges messages 404 with the NRF 304 to register with the NRF 304. The messages 404 include TLS version and parameter information.

The consumer network function 302 then exchanges messages 406 with the NRF 304 for a network discovery request that results in identification of the producer network function 306. Then the consumer network function 302 exchanges messages 408 with the consumer network function to establish SBI communication using the appropriate version of TLS, for example, TLS 1.3 if both network functions 302 and 306 support TLS 1.3 and TLS 1.2 if one or both does not support TLS 1.3.

Figure 5:
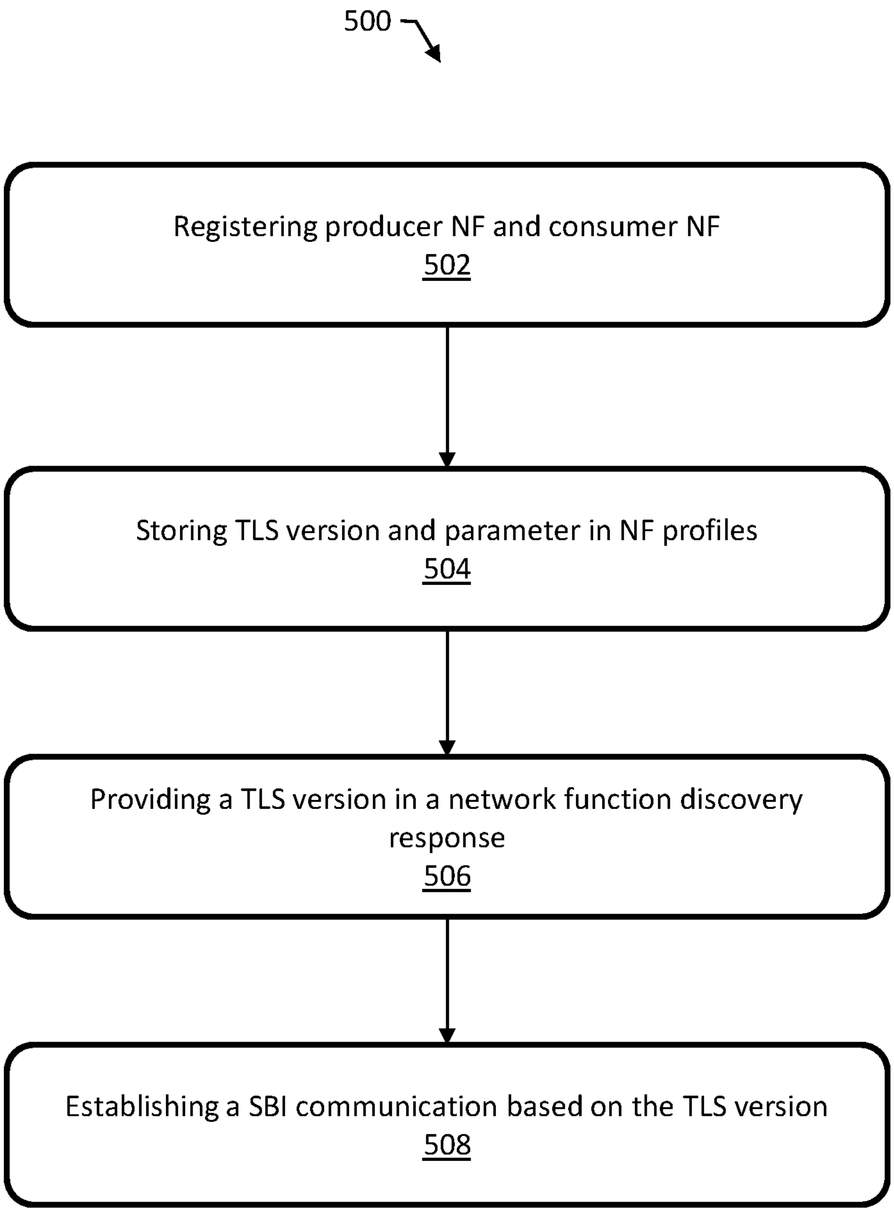
FIG. 5 is a flow diagram of an example method for out-of-band TLS version and parameter negotiation.

FIG. 5 is a flow diagram of an example method 500 for out-of-band TLS version and parameter negotiation.

The method 500 includes registering 502, at an NRF of a telecommunications network, a producer network function and a consumer network function. The registration includes receiving a first TLS version for the producer network function and a second TLS version for the consumer network function.

The method 500 includes storing 504 the first TLS version in a first network function profile for the producer network function and storing 504 the second TLS version in a second network function profile for the consumer network function. The method 500 can include storing one or more first TLS parameters in a first network function profile for the producer network function and storing one or more second TLS parameters in a second network function profile for the consumer network function.

Examples of TLS parameters include cipher suites that dictate cryptographic algorithms like AES-GCM or ChaCha20-Poly1305, determining data encryption methods. Key exchange algorithms, such as RSA or Diffie-Hellman, specify secure key-sharing processes. Certificate information includes details about authentication certificates, like the issuing certificate authority and public key. Hash functions, such as SHA-256, are employed for integrity checks. Session resumption parameters optimize performance by allowing the resumption of previously established secure sessions. Perfect Forward Secrecy (PFS) support ensures ongoing security even if long-term keys are compromised. Additional considerations encompass maximum transmission unit (MTU), renegotiation policies, compression methods, and other configurations, collectively defining the security framework for TLS connections. These parameters align with security policies, compliance requirements, and cryptographic capabilities, safeguarding the confidentiality, integrity, and authenticity of data within the 5G core network.

The method 500 includes providing 506, by the NRF, the first TLS version of the producer network function to the consumer network function in a network function discovery response.

The method 500 includes establishing 508, by the consumer network function, an SBI communication with the producer network function based on the first TLS version for the producer network function and the second TLS version for the consumer network function. For example, if both network functions support TLS 1.3, then the method 500 can include using the TLS 1.3 handshake. If one or the other of the network functions does not support TLS 1.3 but does support TLS 1.2, then the method 500 can include using the TLS 1.2 handshake.

The method 500 can include finding, at the NRF, one or more misconfigured TLS parameters in the network function profiles stored by the NRF. For example, the NRF can continuously or periodically analyze the stored TLS parameters for potential misconfigurations. This can include scrutinizing elements such as cipher suites, key lengths, and protocol versions to identify any deviations from recommended security practices.

The method 500 can include notifying a network operator of the one or more misconfigured TLS parameters. For example, notifying can include sending a message or presenting a notification in a user interface. Upon detecting misconfigured TLS parameters, the NRF can trigger corrective actions, possibly initiating updates or notifications to the relevant network functions. This proactive approach can help ensure that TLS security standards are upheld across the 5G core network, mitigating potential vulnerabilities arising from misconfigurations and contributing to the overall robustness of the communication infrastructure.

The method 500 can include applying one or more operator-based policies using the TLS parameters stored in the network function profiles. Operator-defined policies could encompass a range of security measures tailored to the specific needs and preferences of the network operator. For instance, policies might dictate minimum TLS version requirements, preferred cipher suites, or key exchange algorithms. These policies can be designed to align with regulatory compliance standards or industry best practices, ensuring a standardized and secure communication environment.

The NRF can dynamically apply these policies across the network by evaluating TLS parameters stored in the network function profiles. If a network function's TLS parameters deviate from the defined policies, the NRF could initiate corrective actions, such as signaling the relevant functions to update their configurations accordingly. This approach can be useful, for example, for mitigating the risk of vulnerabilities arising from inconsistent TLS configurations.

The disclosure of each of the following references is hereby incorporated herein by reference in its entirety.

REFERENCES 1. 3rd Generation Partnership Project; Technical Specification Group Core Network and Terminals; 5G System; Network Function Repository Services; Stage 3 (Release 18) 3GPP TS 29.510 V18.4.0 (2023-09)
2. 3rd Generation Partnership Project; Technical Specification Group Services and System Aspects; System architecture for the 5G System; Stage 2 (Release 18) 3GPP TS 23.501 V18.3.0 (2023-09)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method comprising:

registering, at a network function repository function (NRF) of a telecommunications network, a producer network function, including receiving a first transport layer security (TLS) version for the producer network function;

providing, by the NRF, the first TLS version of the producer network function to a consumer network function in a network function discovery response; and establishing, by the consumer network function, a service based interface (SBI) communication with the producer network function based on the first TLS version and a second TLS version for the consumer network function.

2. The method of claim 1, comprising registering, at the NRF, the consumer network function and receiving the second TLS version for the consumer network function during registration.

3. The method of claim 2, wherein registering the producer network function and the consumer network function comprises storing the first TLS version in a first network function profile for the producer network function and storing the second TLS version in a second network function profile for the consumer network function.

4. The method of claim 2, wherein registering the producer network function and the consumer network function comprises storing one or more first TLS parameters in a first network function profile for the producer network function and storing one or more second TLS parameters in a second network function profile for the consumer network function.

5. The method of claim 1, comprising finding, at the NRF, one or more misconfigured TLS parameters in a plurality of network function profiles stored by the NRF.

6. The method of claim 5, comprising notifying a network operator of the one or more misconfigured TLS parameters.

7. The method of claim 1, comprising applying one or more operator-based policies using a plurality of TLS parameters stored in a plurality of network function profiles.

8. A system comprising:

a consumer network function including at least one first processor and a first memory;

a network function repository function (NRF) including at least one second processor and a second memory, the NRF being configured for:

registering a producer network function, including receiving a first transport layer security (TLS) version for the producer network function; and providing, by the NRF, the first TLS version of the producer network function to the consumer network function in a network function discovery response; and wherein the consumer network function is configured for establishing a service based interface (SBI) communication with the producer network function based on the first TLS version and a second TLS version for the consumer network function.

9. The system of claim 8, wherein the NRF is configured for registering, at the NRF, the consumer network function and receiving the second TLS version for the consumer network function during registration.

10. The system of claim 9, wherein registering the producer network function and the consumer network function comprises storing the first TLS version in a first network function profile for the producer network function and storing the second TLS version in a second network function profile for the consumer network function.

11. The system of claim 9, wherein registering the producer network function and the consumer network function comprises storing one or more first TLS parameters in a first network function profile for the producer network function and storing one or more second TLS parameters in a second network function profile for the consumer network function.

12. The system of claim 8, wherein the NRF is configured for finding, at the NRF, one or more misconfigured TLS parameters in a plurality of network function profiles stored by the NRF.

13. The system of claim 12, wherein the NRF is configured for notifying a network operator of the one or more misconfigured TLS parameters.

14. The system of claim 8, wherein the NRF is configured for applying one or more operator-based policies using a plurality of TLS parameters stored in a plurality of network function profiles.

15. A non-transitory computer readable medium having stored thereon executable instructions that when executed by a processor of a computer control the computer to perform steps comprising:

registering, at a network function repository function (NRF) of a telecommunications network, a producer network function, including receiving a first transport layer security (TLS) version for the producer network function;

providing, by the NRF, the first TLS version of the producer network function to a consumer network function in a network function discovery response; and establishing, by the consumer network function, a service based interface (SBI) communication with the producer network function based on the first TLS version and a second TLS version for the consumer network function.

16. The non-transitory computer readable medium of claim 15, the steps comprising registering, at the NRF, the consumer network function and receiving the second TLS version for the consumer network function during registration.

17. The non-transitory computer readable medium of claim 16, wherein registering the producer network function and the consumer network function comprises storing the first TLS version in a first network function profile for the producer network function and storing the second TLS version in a second network function profile for the consumer network function.

18. The non-transitory computer readable medium of claim 16, wherein registering the producer network function and the consumer network function comprises storing one or more first TLS parameters in a first network function profile for the producer network function and storing one or more second TLS parameters in a second network function profile for the consumer network function.

19. The non-transitory computer readable medium of claim 15, the steps comprising finding, at the NRF, one or more misconfigured TLS parameters in a plurality of network function profiles stored by the NRF.

20. The non-transitory computer readable medium of claim 19, the steps comprising notifying a network operator of the one or more misconfigured TLS parameters.

* * * * *